United States Patent
Shikano

[11] Patent Number: 5,953,166
[45] Date of Patent: Sep. 14, 1999

[54] LASER TRAPPING APPARATUS

[75] Inventor: Shuji Shikano, Yokohama, Japan

[73] Assignees: Moritex Corporation, Tokyo, Japan; Research Development Corporation, Kawaguchi, Japan

[21] Appl. No.: 08/975,256

[22] Filed: Nov. 21, 1997

Related U.S. Application Data

[63] Continuation-in-part of application No. 08/597,907, Feb. 7, 1996, abandoned.

[30] Foreign Application Priority Data

Mar. 22, 1995 [JP] Japan ..................................... 7-62757

[51] Int. Cl.$^6$ .............................. G02B 5/04; G02B 27/12; H01S 1/00
[52] U.S. Cl. ........................... 359/837; 359/640; 250/251
[58] Field of Search .................................... 359/837, 639, 359/640; 250/251

[56] References Cited

U.S. PATENT DOCUMENTS

| | | |
|---|---|---|
| 3,547,526 | 12/1970 | Devereux . |
| 4,637,691 | 1/1987 | Uehara et al. . |
| 5,025,438 | 6/1991 | Emoto . |
| 5,212,382 | 5/1993 | Sasaki et al. ............................. 250/251 |
| 5,363,190 | 11/1994 | Inaba et al. .............................. 356/337 |
| 5,495,105 | 2/1996 | Nishimura et al. ..................... 250/251 |
| 5,689,109 | 11/1997 | Schutze ................................... 250/251 |

FOREIGN PATENT DOCUMENTS 5-93871   4/1993   Japan .

OTHER PUBLICATIONS

Physical review letters, vol.54, No. 12, Mar. 25, 1985 "Observation of Radiation–Pressure Trapping of Particles by Alternating Light Beams" A.Ashkin et al, pp. 1245–1248.

Optics Letters/vol. 11, No. 5/May 1986 "Observation of a Single–Beam Gradient Force Optical Trap for Dielectric Particles" A. Ashkin et al., pp. 288–290.

Biophysical Journal, vol. 70, Mar. 1996 "Wavelength Dependence Of Cell Cloning Efficiency After Optical Trapping" Hong Liang et al, pp. 1529–1533.

*Primary Examiner*—Cassandra Spyrou
*Assistant Examiner*—Mark A. Robinson
*Attorney, Agent, or Firm*—Pillsbury Madison & Sutro LLP

[57] ABSTRACT

A laser trapping apparatus for optically trapping an optional micro-particle from a group of micro-particles such as microorganisms suspended in a medium by a laser beam focused at a focal point of an optical converging system at the focal point, the apparatus comprising:

a parallel beam output device for outputting a plurality of laser beams around an optical axis in parallel with said optical axis, and an optical converging system having an objective lens for focusing the plurality of laser beams irradiated from the parallel beam output device to the focal point.

3 Claims, 6 Drawing Sheets

PRIOR ART

LASER TRAPPING APPARATUS

This is a Continuation-in-Part of: National application Ser. No. 08/597,907 filed Feb. 7, 1996, now abandoned.

BACKGROUND OF THE INVENTION

1. Field of the Invention

The present invention concerns a laser trapping apparatus that optically, traps a certain particle from a group of particles, such as microorganisms dispersed and suspended in a medium by a laser beam focused at a focal point of an optical converging system.

2. Description of the Prior Art

The optical particle trapping technique has been developed by A. Ashkin, et al (Physical Review Letters, Vol. 54, 1985).

As shown in FIG. 6, two objective lenses are arranged along an identical optical axis around a trapping position as a center, and two laser beams are irradiated along the identical optical axis from both opposing sides of the trapping position thereby trapping a particle 2 in a cell 3, which is called as "trapping by radiation pressure".

Because the two objective lenses are opposed to each other in use, this system is problematic in that the optical axes of the lenses must be aligned accurately to each other at a 1 μm order.

Further, when a mechanical operation is conducted, such as, sucking a particle trapped between each of the objective lenses by a micropipette, the operation must be conducted by inserting the pipette in a narrow gap between each of the lenses. The top end however can not be moved freely, resulting in a problem of poor maneuverability.

In order to overcome such a disadvantage, A. Ashkin et al have proposed a technique of trapping a particle by irradiating only one laser beam instead of irradiating two laser beams to the particle (Optics Letters Vol. 11 No. 5, 1986).

In this technique, as shown in FIG. 7, a laser beam is converged by one objective lens thereby trapping a particle to a focal point, which is referred to as "single-beam gradient force optical trap".

According to this method, since the particle can be trapped by irradiating light only from one direction, there is no requirement of aligning optical axes of two optical systems. Accordingly, if an optical system of an inverting microscope is utilized to invert the irradiation direction, and a laser beam is irradiated for trapping just beneath a cell 3 storing a liquid medium in which particles 2 are dispersed and suspended, a micropipette or the like can be operated freely since the upper surface of the cell is opened. Therefore, this method has attracted an attention as a technique capable of handling particles easily.

This configuration of laser trapping, however, is problematic in that the optical power density at the focal point is extremely high (from $10^6$ to $10^7$ times of the sunlight on the earth). Therefore the optical power may damage microorganisms when trapped as a particle (refer, for example, to Hong, Liang, et al. Biophysical Journal Vol. 70, 1996).

An objective of laser-trapping a microorganism is to separate only one microorganism from a group of a number of microorganisms.

For this purpose, it is necessary to move one microorganism in a trapped state to a position apart from other microorganisms of the group. Therefore a laser trapping apparatus must have a trapping force capable of enduring movement.

Further, another objective of laser trapping is to irradiate a processing laser beam to a microorganism being trapped by a laser beam to apply processing such as cell fusion. A trapping force capable of enduring the radiation pressure of the processing laser beam is required.

Therefore, it is important that the trapping force is great upon applying operation to the microorganism.

Because the trapping force is in proportion with the optical power, if it is intended to obtain a large trapping force, the optical power must be increased by so much. The increase of the optical power, however, results in a problem of damaging the microorganism.

In view of the above, it is a technical objective of the present invention to obtain a large trapping force without increasing the optical power.

SUMMARY OF THE INVENTION

The foregoing objective of the present invention can be attained by a laser trapping apparatus for optically trapping an optional micro-particle from a group of micro-particles such as microorganisms suspended in a medium by a laser beam focused at a focal point of an optical converging system at the focal point. The apparatus includes a parallel beam output device and an optical converging system.

The parallel beam output device outputs a plurality of laser beams around an optical axis in parallel with the optical axis. The optical converging system has an objective lens for focusing the plurality of laser beams irradiated from the parallel beam output device to the focal points.

According to the present invention, a plurality of parallel beams are incident to an optical converging system and focused to a focal point thereof.

In this case, traces of optical rays focused to the focal point are substantially in symmetry with respect to a plane of symmetry. The plane is defined by an optical axis of the optical converging system and a line in perpendicular to the optical axis. The traces of optical rays are focused from the optical converging system to the focal point on both right and left sides of the plane of symmetry.

Trapping forces of the laser beams are as follows.

First, when single laser beam is irradiated to an optical converging system and focused at a focal point, a spherical particle positioned at the focal point undergoes a force $F_1$ due to the laser beam in the direction of the optical axis and a force $F_2$ due to the laser beam in the direction perpendicular to the optical axis, as shown below.

$F_1 = Q_1 nP/c$
$F_2 = Q_2 nP/c$
n: refractive index of medium
P: optical power
c: velocity of light
$Q_1, Q_2$ : coefficient In a case of irradiating two parallel laser beams $L_1$, $L_2$ to the optical converging system and focusing to the focal point, the trapping forces relative to a spherical particle placed on the focal point is determined, assuming each of the optical power as P/2 and the angle between each of the two laser beams $L_1$, $L_2$ and the optical axis as φ.

Trapping force $F_z$ when an external force is exerted in the direction of the optical axis Z relative to the particle, trapping force $F_{-z}$ when an external force is exerted in the direction of the counter-optical axis -Z, trapping force $F_x$ when an external force is exerted in the direction of the axis X in perpendicular to the optical axis Z within a plane in which the traces of optical rays are present, and trapping force $F_y$ when an external force is exerted in the direction of an axis Y in perpendicular to the axis X and the axis Z are represented, respectively, by the following equations.

$F_z=(Q_1 \cos \phi + Q_2 \sin \phi)_n P/c = Q_z' nP/c$
$F_{-z}=(-Q_1 \cos \phi + Q_2 \sin \phi)_n P/c = Q_{-z}' nP/c$
$F_x=(Q_2 \cos \phi)_n P/C = Q_x' nP/c$, and
$F_y=(Q_1^2+Q_2^2)^{1/2} nP/c = Q_y' nP/c$ When the trapping forces are calculated by using the equations above and compared with those of the single-beam gradient force optical trap using the laser beam, they are shown in Table 1.

TABLE 1

| Direction | 2-beam trap | Single beam gradient force optical trap | Ratio |
|---|---|---|---|
| Z | 0.63 | 0.49 | 1.28 |
| -Z | 0.3 | 0.26 | 1.15 |
| X | 0.25 | 0.31 | 0.81 |
| Y | 0.6 | 0.31 | 1.94 |

Trapping forces are calculated assuming such that $\phi=60°$ in a case of the 2-beam trapping, and the NA of the objective lens as 1.25 (=refractive index: 1.33×sin 70° ) and the intensity distribution of the incident light is uniform in a case of the single-beam gradient force optical trap. Further, the specific refractive index of the particles is defined as 1.2 for each case.

As apparent from the result, large trapping force can be obtained in the 2-beam trapping in each direction except for the direction X.

Particularly, when one particle, among a group of particles, is moved in a trapped state it should be taken into a consideration how the particle is transported at a high speed and it is important that the trapping force in the moving direction be large.

In the case of the 2-beam trapping, if the particle is moved in the direction Y, the trapping force is about twice of the single beam gradient force optical trap and the particle can be moved at a twice speed. On the other hand, if it is moved at an identical speed, the power of the light for trapping the particle can be reduced to ½.

Then, if two laser beams incident to the objective lens are rotated relative to the optical axis Z, the direction Y can be rotated around the axis Z. Accordingly, if the particle is moved in an optional direction, the direction Y of an intense trapping force can be aligned with the moving direction.

Further, making the trapping force uniform in any of the directions on the plane X-Y can be attained by increasing the number of laser beams incident to the objective lens to three or more. In this case, the coefficient $Q_x$, $Q_y$ of the trapping force approaches more to that of the single beam gradient force optical trap as the number of the beams is increased, and the coefficient $Q_z$, $Q_{-z}$ in the direction Z or direction -Z is greater by 15 to 30% compared with the single-beam gradient force.

Since the trapping force is great in the direction of the optical axis Z as described above, it is extremely advantageous also in a case of irradiating a processing laser beam in the direction of the optical axis Z while trapping an micro-organism to apply processing to the microorganism.

DESCRIPTION OF ACCOMPANYING DRAWINGS

Figure 4A:
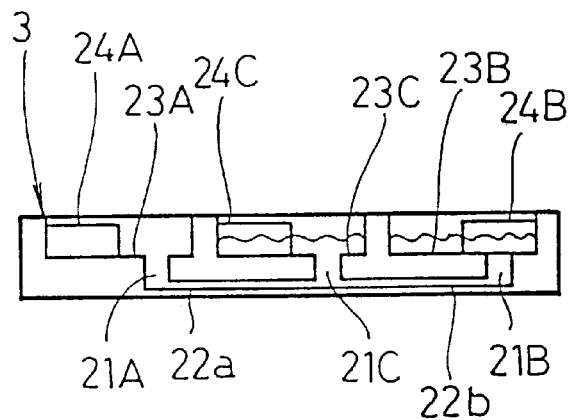
Figure 4B:
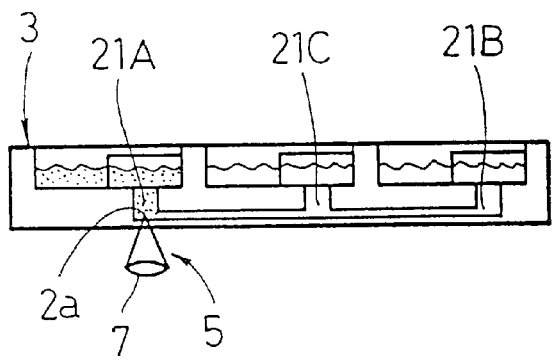
Figure 4C:
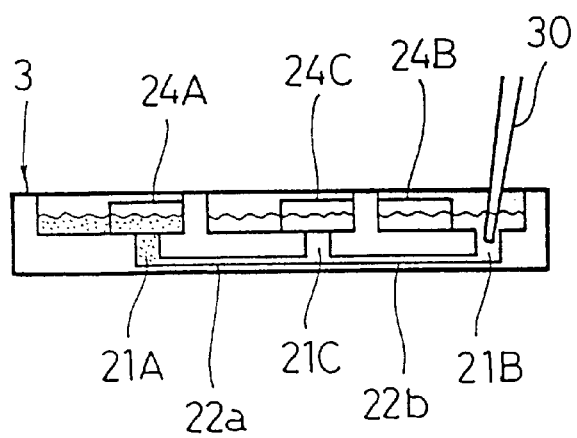
Figure 6:
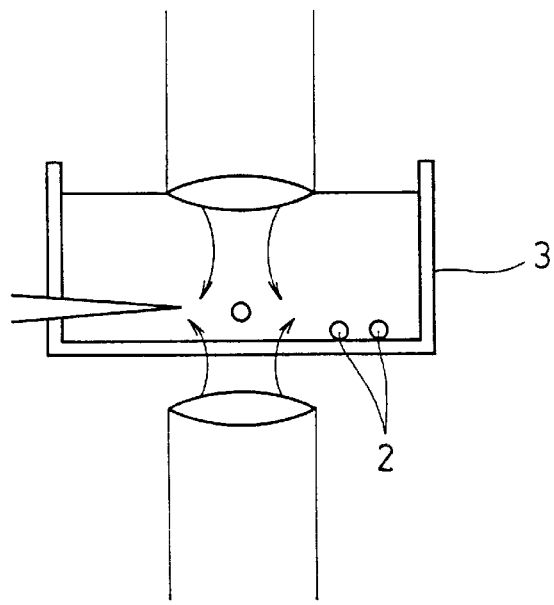
Figure 7:
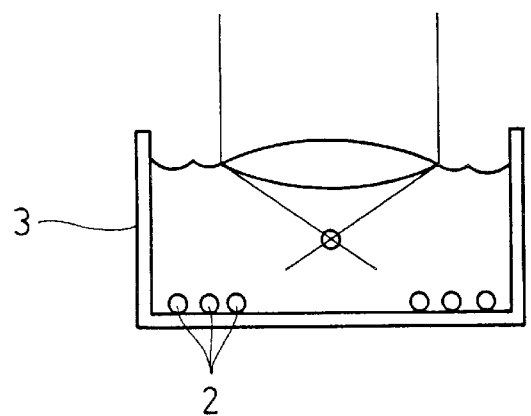

FIG. 4(a)–(c) are explanatory views illustrating the operation;

FIG. 5(a)–(d) are explanatory views illustrating other examples of a prism;

FIG. 6 is an explanatory view illustrating an optical system of a laser trapping apparatus in the prior art; and FIG. 7 is an explanatory view illustrating an optical system of another laser trapping apparatus in the prior art.

DESCRIPTION OF THE PREFERRED EMBODIMENTS

A laser trapping apparatus according to the present invention will be explained more concretely.

Figure 1:
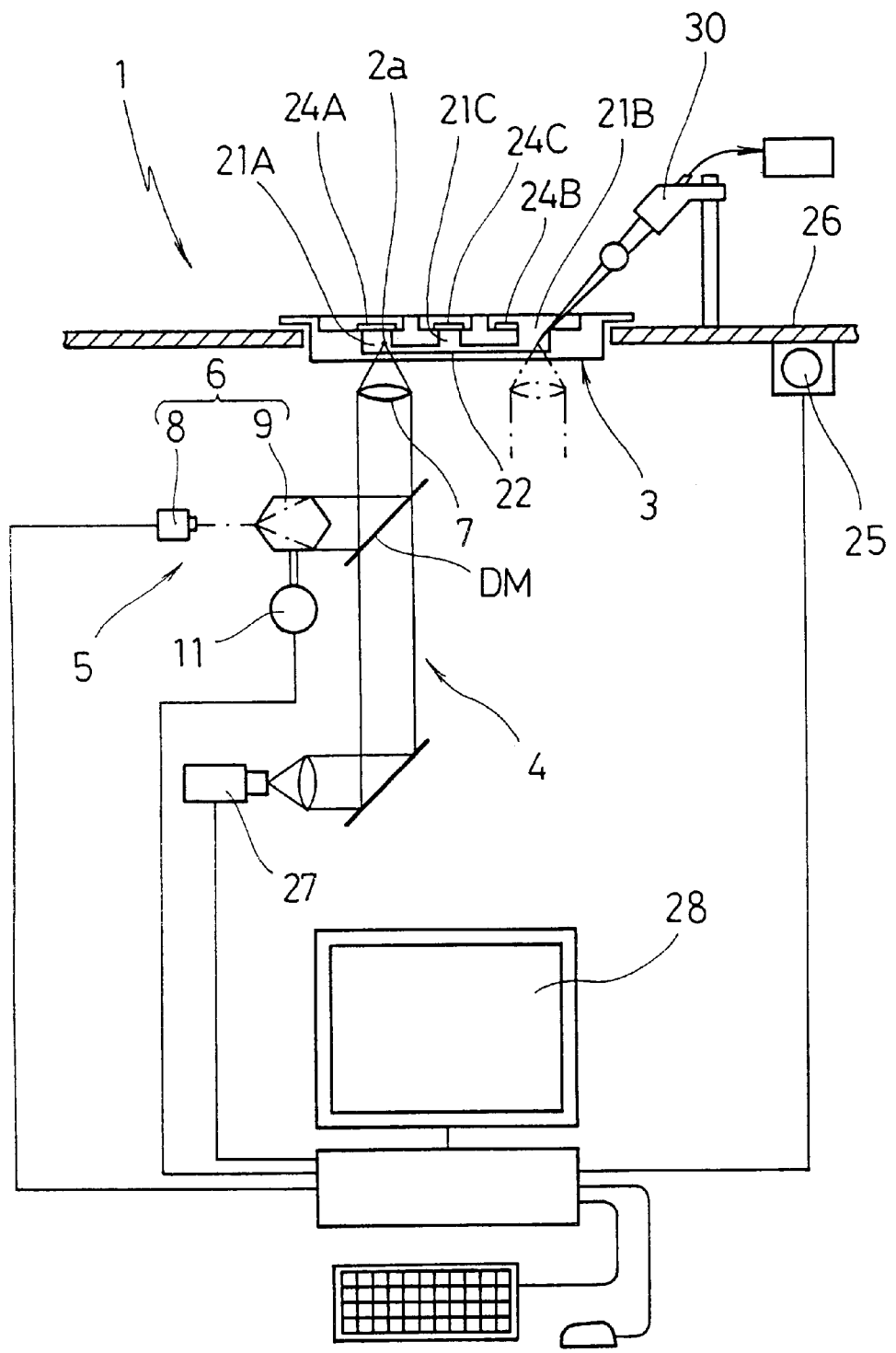
FIG. 1 is an explanatory view illustrating an entire constitution of a laser trapping apparatus according to the present invention.

A laser trapping apparatus 1 shown in FIG. 1 comprises a cell plate 3 for storing a liquid medium in which group of particles 2—such as *Escherichia coli* in the liquid medium, and a laser trapping optical system 5 for irradiating a laser beam to the cell plate 3 from below by utilizing an optical system of an inverting microscope 4, and moving a particle 2 a from a group of particles 2—distributed and suspended in the cell plate 3 in a trapped state in an optional direction thereby separating the trapped particle from other particles 2—of the group.

Figure 2:
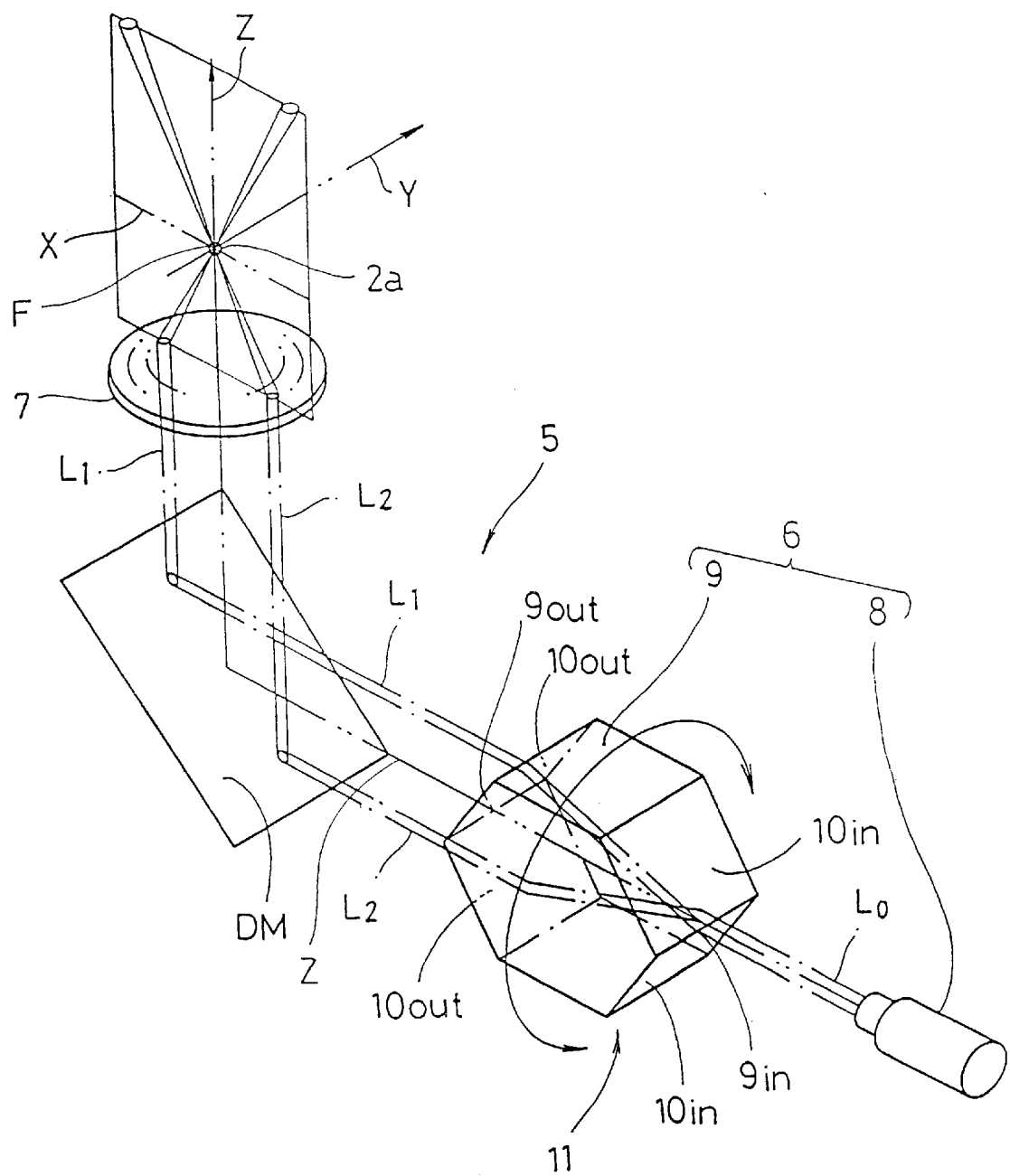
FIG. 2 is an explanatory view showing a main portion thereof.
Figure 3:
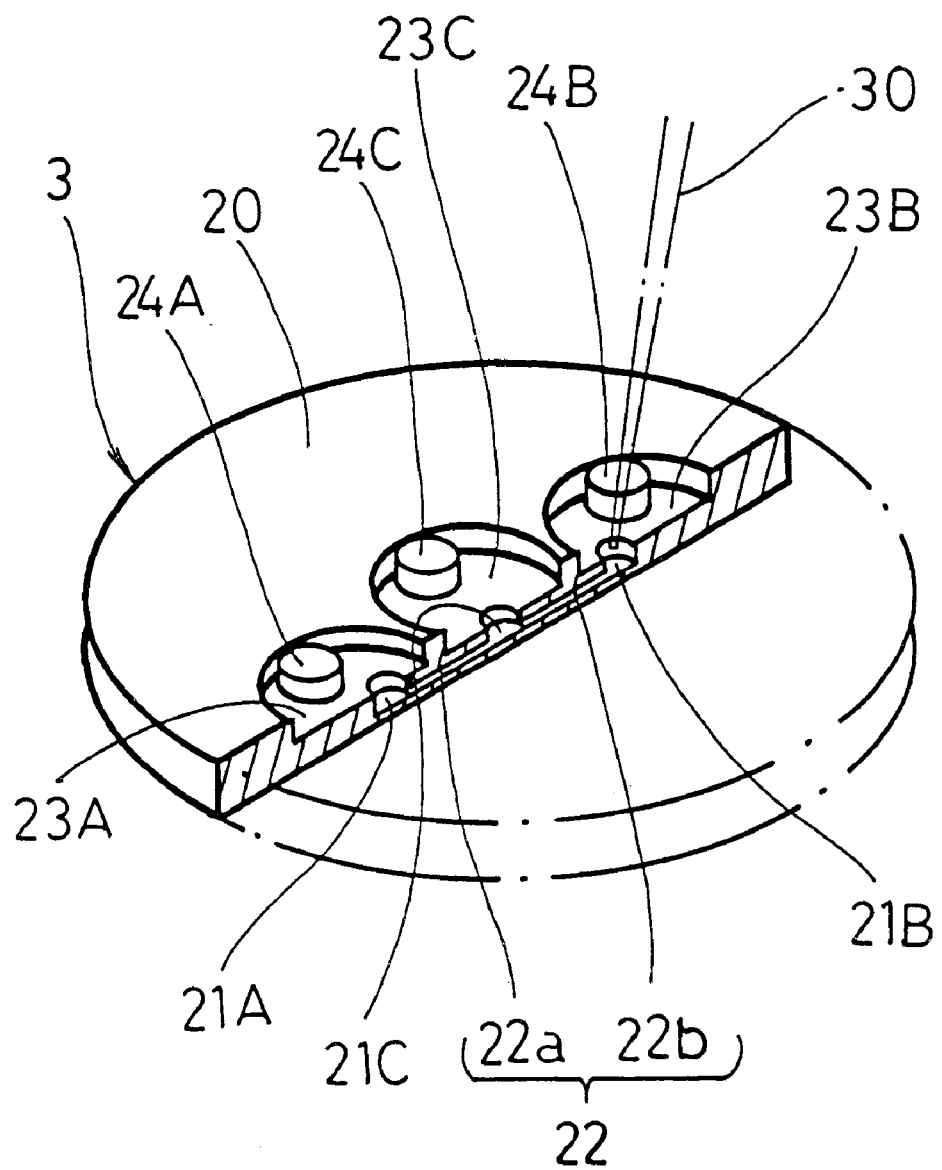
FIG. 3 is a perspective cross sectional view illustrating a cell plate.

As shown in FIG. 2, the laser trapping optical system 5 comprises a parallel beam output device 6 for outputting two laser beams $L_1$, $L_2$ around an optical axis Z of the optical system 5 in parallel with the optical axis Z, a dichroic mirror DM for reflecting the two laser beams $L_1$, $L_2$ irradiated from the parallel beam output device 6 and an objective lens (optical converging system) 7 for focusing the laser beams $L_1$, $L_2$ onto a focal point.

The parallel beam output device 6 comprises a laser light source 8 for outputting a single laser beam $L_0$, and a prism 9 for splitting the laser beam $L_0$ outputted from the laser light source 8 into a plurality of parallel laser beams $L_1$, $L_2$ - - - .

As shown in FIG. 2, the prism 9 is configured such that each of an incident end $9_{in}$ and an emitting end $9_{out}$ is cut into a wedged shape (angled shape) to form two pairs of facets $10_{in}$ and $10_{out}$. Each pair of facets has an apex at an intersection with the optical axis Z, and each of the facets $10_{in}$ formed on the incident end $9_{in}$ is made in parallel with each of the facets $10_{out}$ formed on the emitting end $9_{out}$.

Further, in each of the facets $10_{in}$, $10_{out}$, when the laser beam $L_0$ is irradiated from the laser beam source 8 is incident along the optical axis Z to the incident $^9$in, it is refracted at each facet $10_{in}$, $10_{in}$ formed at the incident end $9_{in}$ into different directions and split into two optical beams $L_1$, $L_2$. Then, when they are emitted from each of the facets $10_{out}$, $10_{out}$ of the emitting end $10_{out}$ being paired with each of the facets $10_{in}$, $10_{in}$ on the incident end $9_{in}$, they are refracted again and emitted as two parallel beams around the optical axis Z as a center.

Then, the prism 9 is disposed rotatably around the optical axis Z as the center to constitute a parallel beam rotating device 11. Therefore such that the incident position of each of the laser beams $L_1$, $L_2$ to the optical converging system 5 is around the optical axis Z as the center in accordance with the direction along which the one particle 2a is to be moved, by the rotation of the two laser beams $L_1$, $L_2$ around the optical axis Z.

The cell plate 3 which contains the liquid medium comprises a plate main body 20 that serves as a cover glass for the inverting microscope 4, a first cell 21A for storing a liquid medium in which a number of micro-particles are dispersed and suspended and a second cell 21B for storing a liquid medium in which no micro-particles are suspended. Each of the cells is opened at the upper surface and formed by being spaced apart a predetermined distance from each other and in communication with each other by a narrow induction channel 22 for inhibiting free movement of micro-particles.

Accordingly, the induction channel 22 has a bottom formed at a high accuracy as a cover glass for the inverting microscope 4 and has a buffer cell 21C formed with the upper surface being opened at the midway for storing a liquid medium in which no micro-particles are suspended.

Thus, the induction channel 22 comprises a first induction channel 22a for communication between the first cell 21A and the buffer cell 21C and a second induction channel 22b for communication between the buffer cell 21C and the second cell 21B.

Each of the cells 11A–11C is formed in each of recesses 23A–23C of a larger diameter as a liquid medium injection port formed on the surface of the plate main body 20. The upper opening for each of the cells 21A–21C is adapted to be opened/closed by each of covers 24A–24C which is moved slidably in the horizontal direction along the bottom of the recesses 23A–23C.

Faces of the recesses 23A–23C and the covers 14A–14C in contact with each other are polished at a high accuracy such that they are in sliding contact with a gap formed at an accuracy on the order of a wavelength of light. Then, each of the cells can be opened/closed without forming a stream in the induction channel 22 when each of the covers 24A–24C is caused to slide.

In the cell plate 3 for separating *Escherichia coli*, each of the recesses 23A–23C is about 9 mm diameter×2 mm depth and each of the cells 21A–21C is about 2 mm diameter×1.8 mm depth. The length of the induction channel 22a and 22b for communication between the cells 21A and 21C and between the cells 21C and 21B is about 9 mm. The cross section for each of the induction channels 22a, 22b is about 0.1 mm square. The thickness for the bottom of each of the cells 21A–21C and the induction channel 22 is about 0.17 mm.

An objective lens 7 of the inverting microscope 4 is placed below a stage 26 disposed moveably in the direction X-Y by a stage moving device 25. A CCD camera 27 for photographing the inside of the plate 3 is set on an optical axis of the microscope. The images taken up by the CCD camera 27 are displayed on a display apparatus 28.

A method of using the apparatus according to the present invention having the foregoing configuration will be explained with reference to an example of separating *Escherichia coli* as the particle 2.

At first, as shown in FIG. 4(a), a clean liquid medium in which no *Escherichia coli* (micro-particles) are present is injected into the cells 21B, 21C of the cell plate 3. When the covers 24B, 24C are caused to slide to close each of the cells 21B, 21C, the liquid medium is filled in the induction channels 22b, 22a by a capillary phenomenon.

Then, as shown in FIG. 4(b), a liquid medium in which a great number of *Escherichia coli* are dispersed and suspended is injected into the cell 21A and the cell 21A is closed by sliding the cover 24A. Then, the stage 26 is moved while observing the inside of the first cell 21A by the display apparatus 28. When a laser beam is irradiated to one *Escherichia coli* 2a, as it is situated at a focal point, the one *Escherichia coli* 2a is trapped.

Laser beams $L_1$, $L_2$ are emitted from the parallel beam emitting device 6 and focused at a focal point F. As shown in FIG. 2, the two laser beams $L_1$, $L_2$ are rotated by a predetermined angle around the optical axis Z by the rotation of the prism 9. The irradiation position of the two laser beams $L_1$, $L_2$ is determined such that the traces of optical rays of each of the laser beams $L_1$, $L_2$ focused by the objective lens 7 to the focal point are made substantially in symmetry with respect to a plane Z-Y. The Z-Y plane is defined with a line Y, (directional line) representing the direction of the induction channel 22 along which *Escherichia coli* 2a which is moved from the focal point, and the optical axis Z such that the traces of the optical rays advance passing through the focal point F and along the plane Z-X in perpendicular to the directional line Y.

That is, the prism 9 is rotated such that the directional line Y is in perpendicular to a plane on which the traces of the optical rays of the laser beams $L_1$, $L_2$ from the objective lens 7 to the focal point and the optical axis Z.

Since this makes the trapping force greatest in the direction Y, that is, about twice of the single-beam gradient force optical trap, *Escherichia coli* 2a can be moved along the induction channel 22 at a twice speed for an identical optical power of the laser beam $L_0$ irradiated from the laser beam source 8. In a case of moving at an identical speed, the optical power of the laser beam $L_0$ irradiated from the laser beam source 8 can be reduced to one-half.

Further, since the trapping force in the direction of the optical axis Z and in the direction –Z is larger than that in the single-beam force optical trap, if the optical power of the laser beam $L_0$ is identical, *Escherichia coli* 2a can be moved faster along the direction of the optical axis Z or –Z. If it is moved at an identical speed, the optical power of the laser beam $L_0$ can be reduced.

Accordingly, *Escherichia coli* can be moved faster for a same level of allowable biological damages and biological damages can be reduced if moved about at the same speed.

Then, as shown in FIG. 4(c), when the cover 24B is opened by sliding at the instance the *Escherichia coli* 2a is moved to the cell 21B, and the liquid medium in the cell 21B is sucked by a micropipette 30 or the like, since only one *Escherichia coli* moved by laser trapping is present in the cell 21B, this one *Escherichia coli* 2a can be separated reliably from other *Escherichia coli* of the group 2 - - - .

In the foregoing explanation, the parallel beam output device 6 has been explained to a case of using the prism 9 for splitting the laser abeam $L_0$ irradiated from the laser beam source 8 into two laser beams $L_1$, $L_2$, but the present invention is not restricted only thereto but a plurality of laser beam sources may be used.

The laser beam $L_0$ is split by the prism 9 not only in to two laser beams $L_1$, $L_2$, but may be split into more than two laser beams.

Figure 5A:
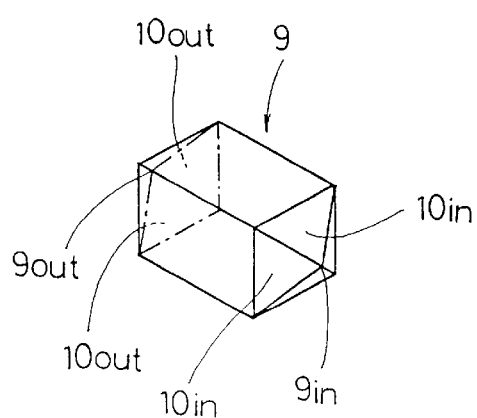
Figure 5B:
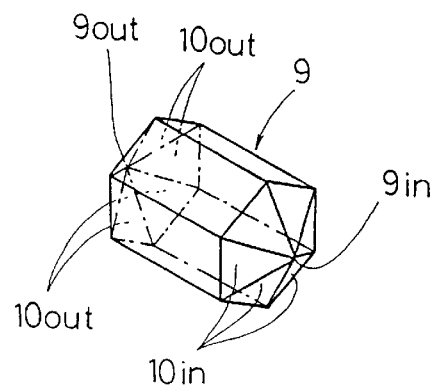
Figure 5C:
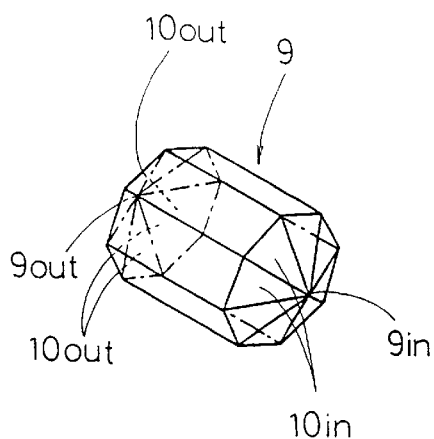
Figure 5D:
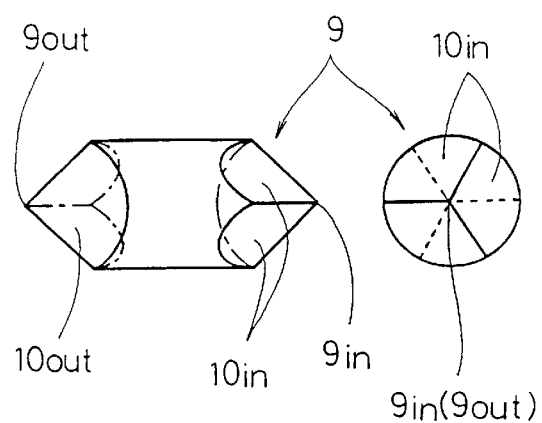

In this case, the prism 9 may be a normal tetragonal cylinder having an incident end $9_{in}$ and an emitting end $9_{out}$ on both ends in which normal tetragonal pyramidical slopes $10_{in}$, - - -, $10_{out}$ - - - are formed to each of them as shown in FIG. 5(a). A normal hexagonal cylinder having an incident end $9_{in}$ and an emitting end $9_{out}$ on both ends in which normal hexagonal pyramidical slopes $10_{in}$, - - - , $10_{out}$ - - - are formed to each of them as shown in FIG. 5(b). A normal octagonal cylinder having an incident end $9_{in}$ and an emitting end $9_{out}$ on both ends in which normal octagonal pyramidical slopes $10_{in}$, - - - , $10_{out}$ - - - are formed to each of them as shown in FIG. 5(c). A circular cylinder having an incident end $9_{in}$ and an emitting end $9_{out}$ on both ends in which normal trigonal pyramidical slopes $10_{in}$, - - - , $10_{out}$ - - - are formed to each of them as shown in FIG. 5(d).

In a case of irradiating a laser beam for processing further to a trapped microorganism, a laser beam irradiated from a source of a processing laser beam (not illustrated) may also be introduced to the optical system of the inverting microscope 4, transmitted through the dichroic mirror D of the laser trapping optical system 5 and irradiated coaxially to the particle.

As described above, according to the present invention in a case of trapping, for example, by two laser beams, the two laser beams $L_1$, $L_2$ are irradiated such that the traces of optical rays of each of the laser beams focused by the objective lens to the focal point are substantially in symmetry with respect to the plane Z-Y defined with the line Y in perpendicular to the optical axis Z, and the optical axis Z and such that the optical traces of the optical rays advance passing through the focal point and along the plane Z-X in perpendicular to the directional line Y.

In this case, because the trapping force is greatest in the direction Y and it is about twice of the single-beam gradient force optical trap, the micro-particle can be moved in the direction Y at a twice speed for an identical optical power of the laser beam irradiated from the laser beam source. If the micro-particle is moved at an identical speed, the optical power of the laser beam irradiated from the laser beam source can be reduced to one-half.

Further, if the optical power of the laser beam $L_0$ irradiated from the laser beam source is identical, the micro-particle can be moved faster in the direction of the optical axis Z or –Z. On the other hand, if it is moved at the identical speed, the optical power of the laser beam $L_0$ can be reduced to suppress biological damages.

Further, when the two laser beams incident to the objective lens are rotated relative to the optical axis Z, since the axis X rotates around the optical axis Z, the axis Y of intense trapping force rotates correspondingly around the optical axis Z and the direction Y can be aligned with a desired direction to move the micro-particle.

Further, because the trapping force in the direction of the optical axis Z and –Z is also greater than that of the single-beam gradient force optical trap, it is extremely advantageous in a case of processing a microorganism by irradiating a laser beam for processing in the direction of the optical axis Z which trapping the microorganism.

What is claimed is:

1. A laser trapping apparatus for optically trapping an optional micro-particle from a group of micro-particles such as microorganisms suspended in a medium by a laser beam focused at a focal point of an optical converging system at said focal point, said apparatus comprising:

a parallel beam output device for outputting a plurality of laser beams around an optical axis in parallel with said optical axis, wherein said parallel beam output device further comprises:

a laser beam source for outputting a laser beam; and a prism for splitting the laser beam outputted from the laser beam source into a plurality of parallel lights, wherein the prism is disposed rotatably around the optical axis as a center and configured such that a plurality of pairs of facets are formed at each incident and emitting end, each pair having an apex at the optical axis;

each of the facets formed at the incident end is made in parallel with the corresponding facet formed at the emitting end; and each of the facets is formed such that a laser beam incident along the optical axis to the incident end is refracted at each of the facets formed at the incident end into different directions, respectively, and split into a plurality of radially diverging optical beams, and then refracted again when emitted from the facet at the emitting end being paired with each of the facets at the incident end, and outputted as a plurality of parallel lights situating at the periphery of the optical axis as a center; and an optical converging system having an objective lens for focusing the plurality of laser beams irradiated from the parallel beam output device to the focal point.

2. A laser trapping apparatus for optically trapping an optional micro-particle from a group of micro-particles, such as microorganisms suspended in a medium by a laser beam focused at a focal point of an optical converging system, and moving said one micro-particle in a direction perpendicular to the optical axis, wherein the apparatus comprises:

a parallel beam output device for outputting a plurality of laser beams around an optical axis in parallel with said optical axis, wherein said parallel beam output device further comprises:

a laser beam source for outputting a laser beam; and a prism for splitting the laser beam outputted from the laser beam source into a plurality of parallel lights, wherein the prism is disposed rotatable around the optical axis as a center and configured such that a plurality of pairs of facets are formed at each of an incident and emitting end, each pair having an apex at the optical axis;

each of the facets formed at the incident end is made in parallel with the corresponding facet formed at the emitting end;

each of the facets is formed such that a laser beam incident along the optical axis to the incident end is refracted at each of the facets formed at the incident end into different directions, respectively, and split into a plurality of radially diverging optical beams, and then refracted again when emitted from the facet at the emitting end being paired with each of the facets at the incident end, and outputted as a plurality of parallel lights situating at the periphery of the optical axis as a center; and an optical converging system having an objective lens for focusing the plurality of laser beams irradiated from the parallel beam output device to the focal point, the plurality of laser beams being incident to the optical converging system such that traces for optical rays focused by the optical converging system to the focal point are substantially in symmetry with respect to a plane defined with an optical axis of the optical converging system and a line representing a direction along which the micro-particle at the focal point is intended to be moved.

3. A laser trapping apparatus as defined in claim 1 or 2, wherein the parallel beam output device is adapted to irradiate two laser beams to the optical converging system, and the two laser beams are incident to the optical converging system such that traces for optical rays focused by the optical converging system to the focal point are substantially in symmetry with respect to a plane defined with the optical axis of the optical converging system and a line in perpendicular to the optical axis such that the traces for the optical rays advance along the optical axis and along a plane in perpendicular to a plane of symmetry.

* * * * *